(12) United States Patent
Kolin

(10) Patent No.: US 9,721,152 B1
(45) Date of Patent: Aug. 1, 2017

(54) ATHLETIC TRAINING METHOD AND SYSTEM

(71) Applicant: Asaf Kolin, Los Angeles, CA (US)

(72) Inventor: Asaf Kolin, Los Angeles, CA (US)

( * ) Notice: Subject to any disclaimer, the term of this patent is extended or adjusted under 35 U.S.C. 154(b) by 388 days.

(21) Appl. No.: 14/519,113

(22) Filed: Oct. 20, 2014

Related U.S. Application Data

(60) Provisional application No. 61/961,877, filed on Oct. 25, 2013.

(51) Int. Cl.
*A63F 9/00* (2006.01)
*G06K 9/00* (2006.01)

(52) U.S. Cl.
CPC .................. *G06K 9/00342* (2013.01)

(58) Field of Classification Search
None
See application file for complete search history.

(56) References Cited

U.S. PATENT DOCUMENTS

| | | | |
|---|---|---|---|
| 2010/0164862 A1* | 7/2010 | Sullivan ............... | G06K 9/3216 345/156 |
| 2010/0273556 A1* | 10/2010 | Briggs .................. | A63F 13/95 463/36 |
| 2011/0304497 A1* | 12/2011 | Molyneux ............ | A43B 1/0054 342/42 |
| 2012/0327194 A1* | 12/2012 | Shiratori ............... | G06F 3/011 348/47 |
| 2013/0166049 A1* | 6/2013 | Werner ............... | G06F 19/3481 700/91 |
| 2013/0325396 A1* | 12/2013 | Yuen ..................... | G01C 22/006 702/160 |
| 2014/0156036 A1* | 6/2014 | Huang .................. | H04W 4/027 700/91 |
| 2015/0209614 A1* | 7/2015 | Lee ........................ | A63B 31/00 482/8 |

* cited by examiner

*Primary Examiner* — Seng H Lim

(57) ABSTRACT

A method and system for athletic training includes a plurality of devices including receiver circuitry and processors to receive signals from at least one body-worn beacon. The signals are distance limited such that proper reception indicates arrival in proximity to a device from the plurality of devices. The arrival is sensed by a device and relayed to other devices to actuate indicators on such devices to guide a user wearing the beacon in the direction of such actuated indicator. The times of arrival and departure from the vicinity of each such device from the plurality of devices is reported to an application that is used to measure an athlete's performance when traversing a course defined by such devices in the form of cones.

13 Claims, 9 Drawing Sheets

ATHLETIC TRAINING METHOD AND SYSTEM

PRIORITY CLAIM

This application claims priority to U.S. Provisional Application No. 61/961,877, filed on Oct. 25, 2013.

BACKGROUND

Athletic activities such as Tennis, Soccer, Football, and Basketball require certain skills. For example, in Tennis, participants should have good hand-eye coordination as well as running and acceleration ability. In Soccer and Football, similar skills are required such as running at high speed, acceleration and hand-eye or Foot-eye coordination. Common to these activities, and several others, is the advantage provided by an ability to run at high speed and change direction to avoid an opponent or reach a game ball (such as in Tennis). This can be characterized generally as an ability to traverse a particular course including acute angle movements in the shortest possible time. Other agility aspects, such as those dependent on precision rather than time, could also provide significant advantage during participation in various athletic activities.

The training required for participants to achieve such skills usually involves a running course drill, where a trainer directs athletes to follow a given path defined by features such as cones. There is generally no precise way for the trainer to determine whether the athlete has performed a drill appropriately. For example, there is generally no convenient and cost effective way to determine if the athlete approached all obstacles or traversed the course within the allotted time. Additionally, there is no convenient method to motivate and entice athletes to train by following such course without supervision of a trainer/coach.

SUMMARY

Accordingly, the present invention includes a system for athletic training, which could be adapted to facilitate various drills applicable to various athletic activities. A system constructed in accordance with the invention allows for tracking of student performance when executing movement-based drills such as by traversing a particular path. This tracking also provides a measurement of time during which the participating student is engaged with various features of the athletic training drill. Additionally, the system can be used without the presence of a coach by reference to preset parameters that a coach or another outside party has provided such as by providing a predetermined patterns for the particular drill including various parameter relating to traversal time and distance from obstacles, for example.

In one embodiment, a body-worn beacon is configured to transmit data over a short range, the data specially constructed to allow for spatial resolution by a properly compatible receiver unit. A first portable receiver unit is positioned in close proximity to the body-worn beacon, the portable receiver is configured to receive data from the beacon and further configured to resolve distance data to the beacon by reference to specially constructed data received from the beacon. A second portable receiver unit is positioned a predetermined distance from said first portable receiver unit, the second portable receiver unit is receiving a signal from the first portable receiver unit, the second portable receiver unit responds to the signal by actuating a visual indicator on the second portable receiver unit exterior such that it is human perceptible. A second receiver unit is coupled to the second portable receiver unit and is configured to receive the specially constructed data from the beacon and record such reception.

In another embodiment, the invention provides a housing configured to contain electronic components and to allow for positioning the apparatus on a flat surface in an upright orientation. A battery module is provided to supply power to the electronic components contained within the housing. A radio transceiver is configured to receive beacon identifier signals over a predetermined frequency using a predetermined radio technology. A distance resolution module correlates beacon identifier signal properties with distance between the transmitting beacon and the radio transceiver. A human perceptible indicia generating module generates a human perceptible indicia in response to an externally generated signal received by the radio transceiver over a predetermined frequency and using a predetermined radio technology. A processing module is configured to execute computer instruction that instruct the radio receiver/transmitter to externally transmit an instruction to an indicia generating module to generate an indicia in response to a predetermined parameter related to data sensed by the processing module.

In yet another embodiment, the invention provides an athletic training method that includes transmitting instructions to a plurality of smart-cones to indicate relative position. At least one smart-cone is reporting position relative to other smart-cones. Each of the positioned cones is configured to sense beacon signals in its vicinity. In response to sensing a beacon in the vicinity, the smart-cone reports at least beacon signal arrival and departure relative times. A human perceptible indication is generated at a smart-cone that is configured to sense beacon arrival according to a smart-cone traversal order. Finally, the method provides feedback by actuating a haptic circuit in a beacon module that is generating the sensed signals.

DETAILED DESCRIPTION

The structure and operation of a system constructed in accordance with the invention will now be discussed with reference to an example configuration of course-defining objects (smart-cones) constructed according to the invention, as well as beacon devices appropriate to be incorporated into a system of the invention. Initially, the utilization of the various components in a configuration for performing an example movement drill is illustrated. Next, the structure and operation of the smart-cones in the context of the example system is discussed. Additionally, the structure and operation of an example body-worn device appropriate for the example system is discussed. Further, details relating to a computer executed user interface for interacting and controlling a system of the invention is described. Finally, the description that follows also includes discussion of signals communication between the various components of the invention in the context of various embodiments.

Configuration of the Exemplary System

It has been observed that to objectively measure student execution of a drill, one could refer to the speed/acceleration vectors associated with the user as he or she traverses a preset course. For example, the determine whether the student has achieved a high degree of skill in soccer dribbling drill where the object is to run at a target and cut away from the target as close to the target as possible, one could measure the participants movement vectors as they dribble a soccer ball towards the target. Next, one could also measure the movement vectors as the participant moves away from such target. Additionally, one could measure the distance from the target when such movement vectors change direction to a vector moving away from the target indicating participant change of direction.

Figure 1A:
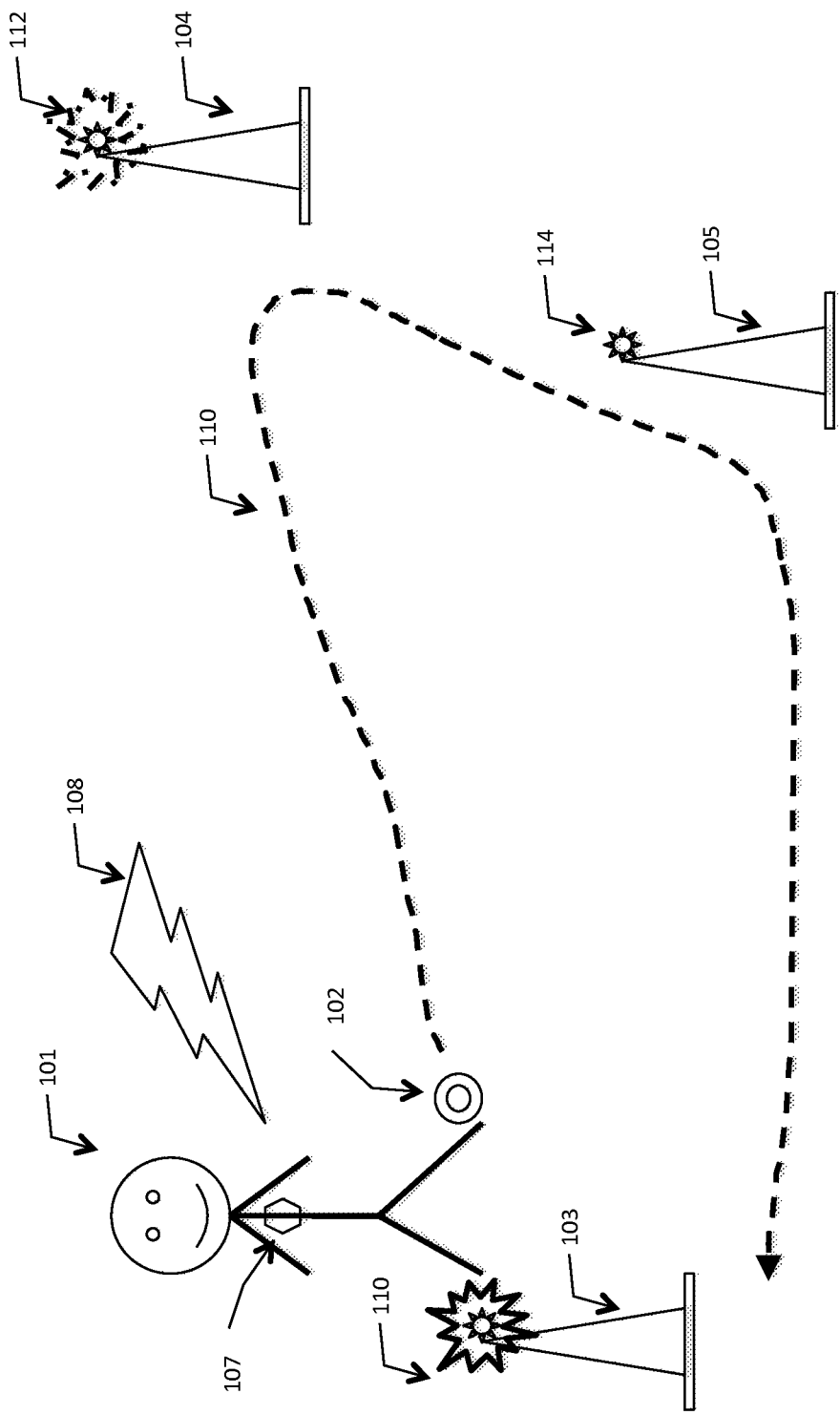
FIGS. 1A to 1C illustrate various components and elements of an athletic exercise system of the invention facilitating an athletic traversal course defined by a series of smart-cones.
Figure 1B:
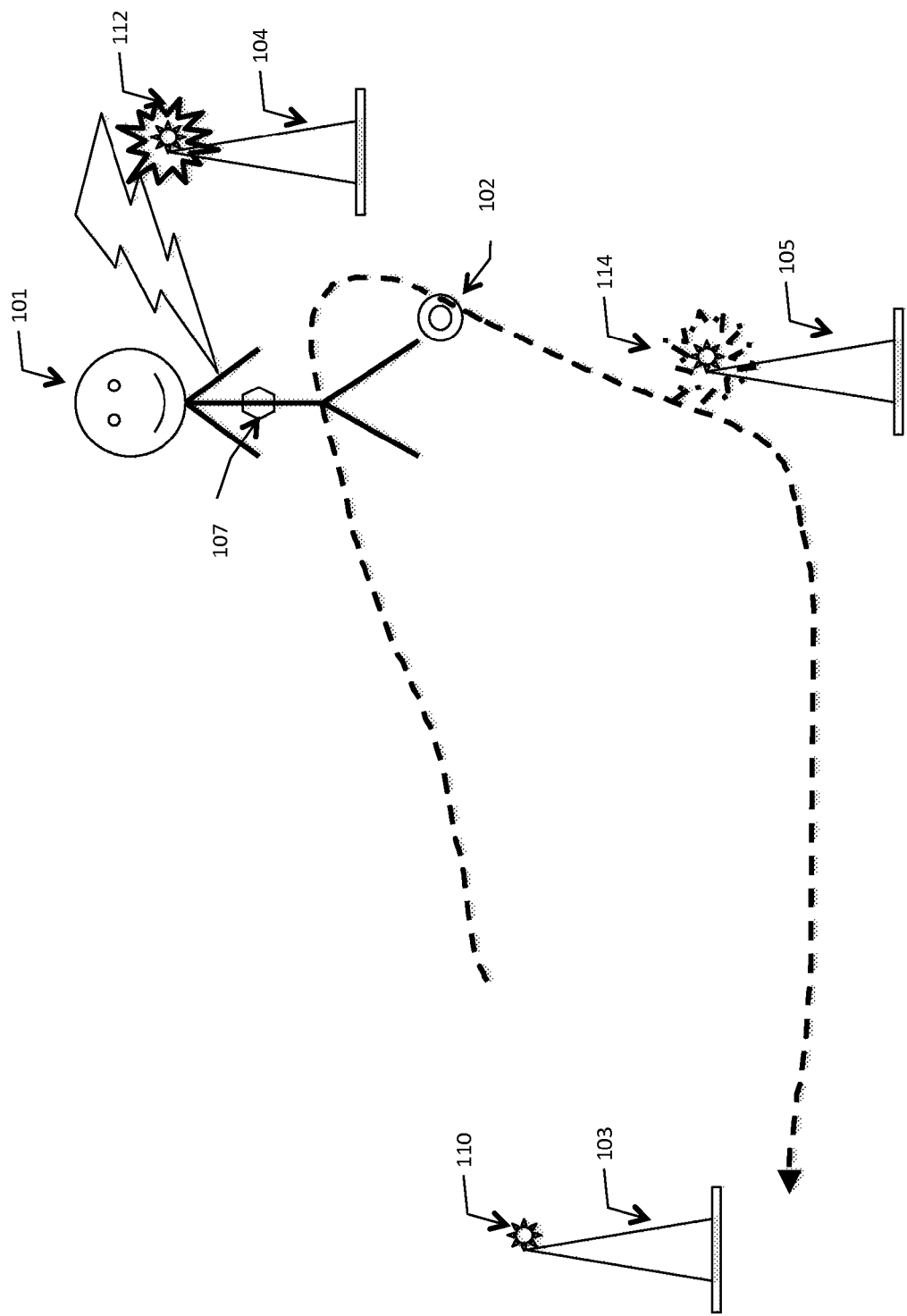
Figure 1C:
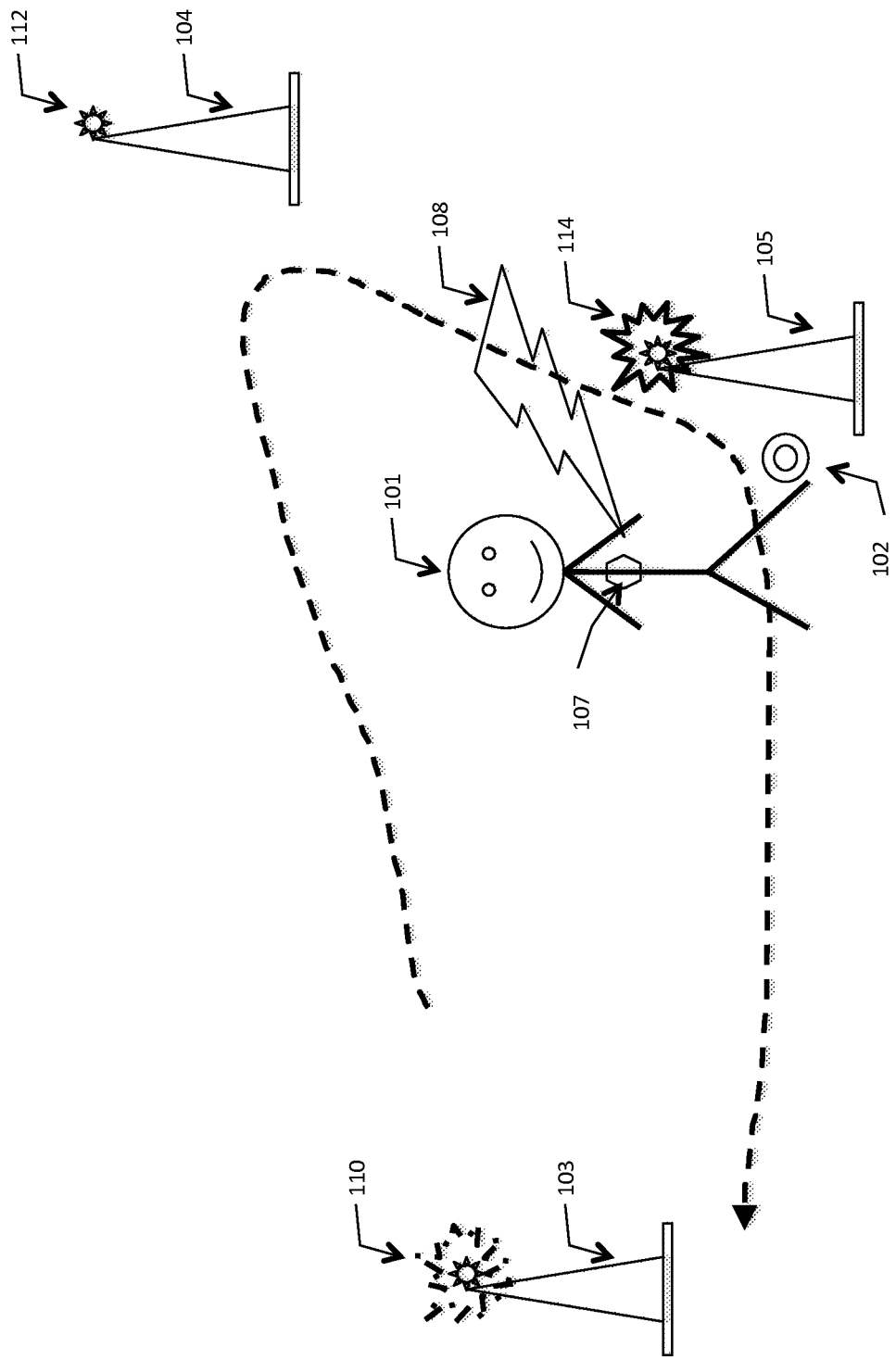

FIGS. 1A to 1C illustrate a configuration of smart-cones 103, 104, and 105 and a body worn device (beacon) 107. The figures illustrate the state of the cones 103, 104, and 105, during progression of the body worn beacon 107 within a course defined by such cones. As can be observed, the user 101 wearing the beacon 107 starts from a position proximate to a first smart-cone 103. The beacon 107 preferably transmits a periodic signal 108 including encoded data that can be used to distinguish the beacon from other beacons in the configuration (e.g., worn by other participants). In one embodiment, the beacon signal transmission 108 is in response to a signal from a control application (not shown) indicating the start of a drill. In another embodiment, the beacon signal periodic transmission 108 is in response to detection of motion by a motion sensor (accelerometer) embedded within the beacon 107.

As is illustrated in FIG. 1A, when the user is proximate to the first smart-cone 103, an indicator 112 is actuated by the second smart-cone in the planned route. For example, this indication can be generated by the control application receiving a signal from the first cone indicating the arrival by the beacon 107 proximate to the first smart-cone 103, which prompts a response transmission from the control application to the second smart-cone 104 to initiate actuation of the indicator of the second smart-cone 112. In one embodiment, the indicator 112 is a light blinking in a predetermined pattern. When the user worn beacon 107 moves a predetermined distance away from the first smart-cone 103, the event is sensed (and optionally relayed to the control application substantially contemporaneously) by the first smart-cone. The first smart-cone 103 then reports such arrival and departure events to the control application.

In FIG. 1B, the user, along with beacon 107, has traversed a path to the proximity of the second smart-cone 104, such that a predetermined distance threshold has been exceeded. The second smart-cone 104 detects such arrival by the beacon 107 and responds by recording and optionally reporting such event. Additionally, the second smart-cone modifies the indicator 112 to provide visual feedback to the user wearing the beacon 107 that the user has moved to the appropriate location within the drill course defined by the smart-cones 103, 104, and 105. As may be appreciated from the description of FIG. 1A, the arrival of the beacon 107 within proximity to a smart-cone 104 results in reporting of such event as well as actuation of an indicator corresponding to the next smart-cone 105 in the predetermined path (either by direct communication or relay by way of the control application).

FIG. 1C illustrated the arrival of the user and associated worn beacon 107 at the third smart-cone 105. As may be appreciated, such arrival of the beacon 107 within a predetermined distance to the third smart-cone 105 is sensed by the cone (and optionally reported to the control application contemporaneously). Furthermore, the arrival within the sensing zone of the third smart-cone 105, results in actuation of the indicator 110 of the first smart-cone 103 to indicate to the user that such location is where they should move next. On arrival within predetermined distance from the first smart-cone 103, the indicator 110 of the first smart-cone changes pattern to indicate completion of the exercise. On such completion, each smart-cone 103, 104, and 105 preferably communicates the sensed data to a data repository (when not already communicated). In one embodiment, the data repository in on an external device, such as a smartphone. In another embodiment the data repository is in a designated or is distributed between several of the smart-cones. In another alternative the data is downloaded from the smart-cones to a computing platform over a wired connection such as USB.

As may be appreciated, the system and interaction illustrated in FIGS. 1A to 1C is just one example of how objective data can be observed and measured when a user is participating in a movement drill configured by employing a system of the invention. Other data can be observed from movement drills as related to the student position over the course of time during which the drill is executed. For example, a coach could employ a combination of maximum running speed and distance-from-target information to determine whether the student has appropriately executed a drill by comparing such measurements to specific goals or combinations of such vectors that result in satisfactory completion of the drill. Other parameters could also provide valuable insight to a coach, such as angle of movement, body posture, acceleration, etc. Additionally, the coach could observe variation in performance characteristics over time for a particular student to observe certain trends such as acceleration ability, stopping, direction change, etc.

Figure 2:
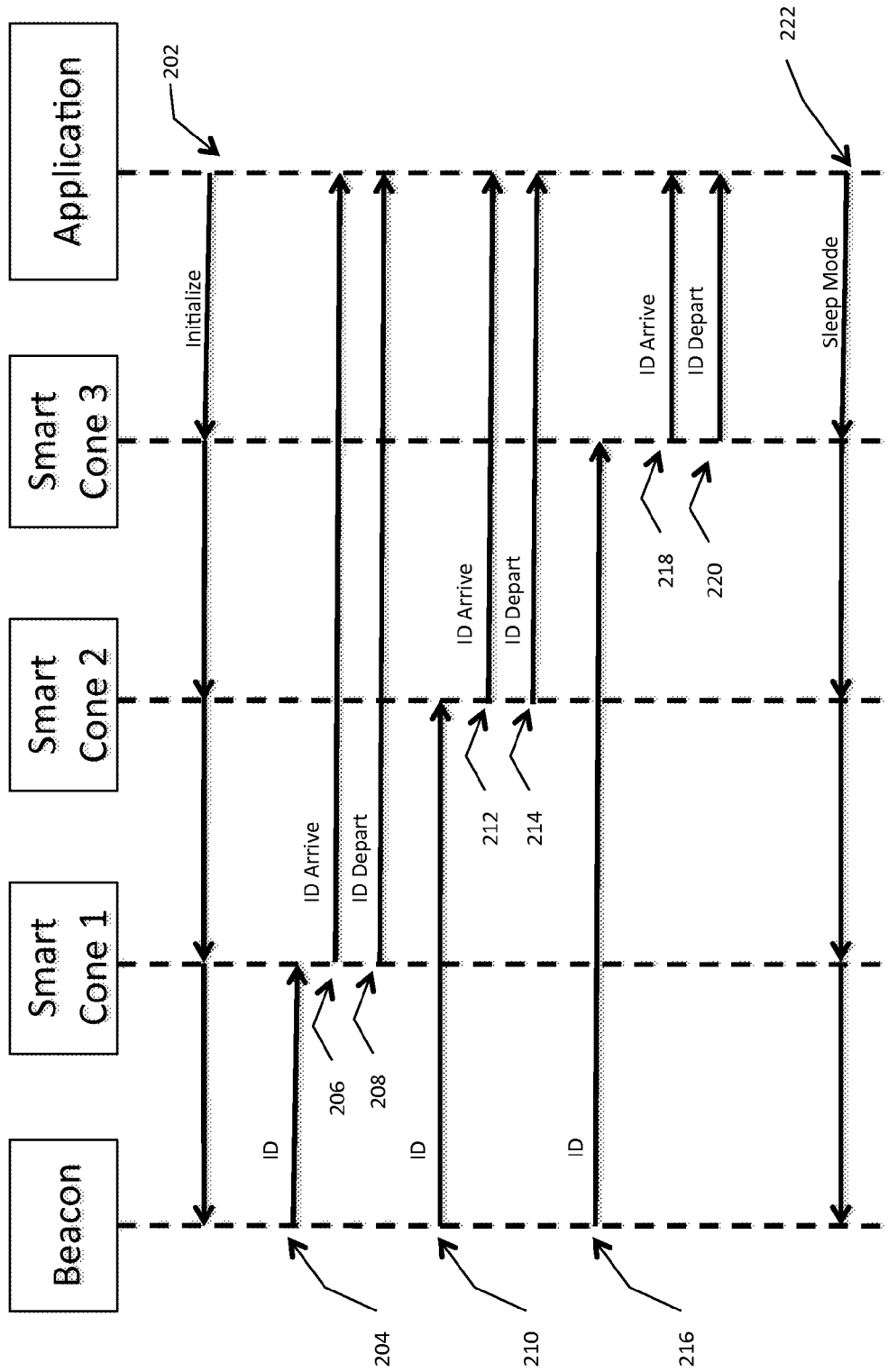
FIG. 2 illustrates data transmitted between the beacon, cones and an application associated with the example system of FIG. 1.

FIG. 2 illustrates times during traversal of the course when data is exchanged between various elements of the example system of FIGS. 1A-1C. A system of the present invention allows an instructor or coach to track such variables and provides readily available feedback regarding student execution of drills. Alternatively, the information can be relayed directly back to the student to allow for self-correction when performing drills without the presence of a coach such as by beacon vibration or cone-lights flashing at a predetermined pattern.

As may be appreciated, the first step in constructing a course by using the system of the invention is placing the smart-cones in appropriate positions. An initialization signal 202 is transmitted from the control application to each of the smart-cones. In one embodiment, the initialization signal indicates to each cone how far it should be positioned from other cones. For example, the signal to smart-cone 1 might indicate 20 ft from Cone 2 and 10 ft from cone 3. In the same manner, the signal to cone 2 might indicate that it has to be 10 ft from cone 3. Preferably, the smart-cones include an element that is used to determine distance between one another. In one embodiment, a radio signal strength (such as WiFi or BT radio) is used to approximate distance from one cone to another. In another embodiment a camera is used to approximate distance by including a known dimension marking on each cone that can be used to approximate distance, as is known in the art (e.g., distance to golf pin by measuring size of flag, etc.). Such camera may also be leveraged by the smart-cone to provide finer sensing of user movement, such as when tracking soccer player moves in close proximity to the smart-cone.

An initialization signal 202 is also provided to the beacon to indicate that a drill is activated. In one embodiment, such initialization signal received by the beacon automatically wakes the beacon from a "Sleep" mode. As may be appreciated, on waking from a "Sleep" mode, the beacon is able to transmit its ID 204 and thereby allows sensing by the various smart-cones of the configured course. When the user is in the proximity of the first cone, such ID is received at the first cone and is thereby sensed. The ID arrival is reported to the control application (Step 206). When the user moves away from the first cone (presumably in the direction of the second cone, as instructed), the departure of the sensed ID is also reported to the control application (step 208).

Next, the beacon continues to transmit its ID in the vicinity of the second smart-cone (step 210). The ID arrival is reported to the control application (Step 212). When the user moves away from the second cone (presumably in the direction of the third cone, as instructed), the departure of the sensed beacon ID is also reported to the control application (step 214).

Finally, the beacon transmits its ID in the vicinity of the third smart-cone (step 216). The ID arrival is reported to the control application (Step 218). When the user moves away from the third cone (presumably in the direction of the first cone, as instructed), the departure of the sensed ID is also reported to the control application (step 220). In this example, the departure from the vicinity of the third cone indicates completion of the set course. Accordingly, the control application transmits as "sleep" signal (step 222) to the smart-cones and the beacon to indicate that the devices (smart-cones and beacons) should transition to a lower power consumption state.

Figure 3:
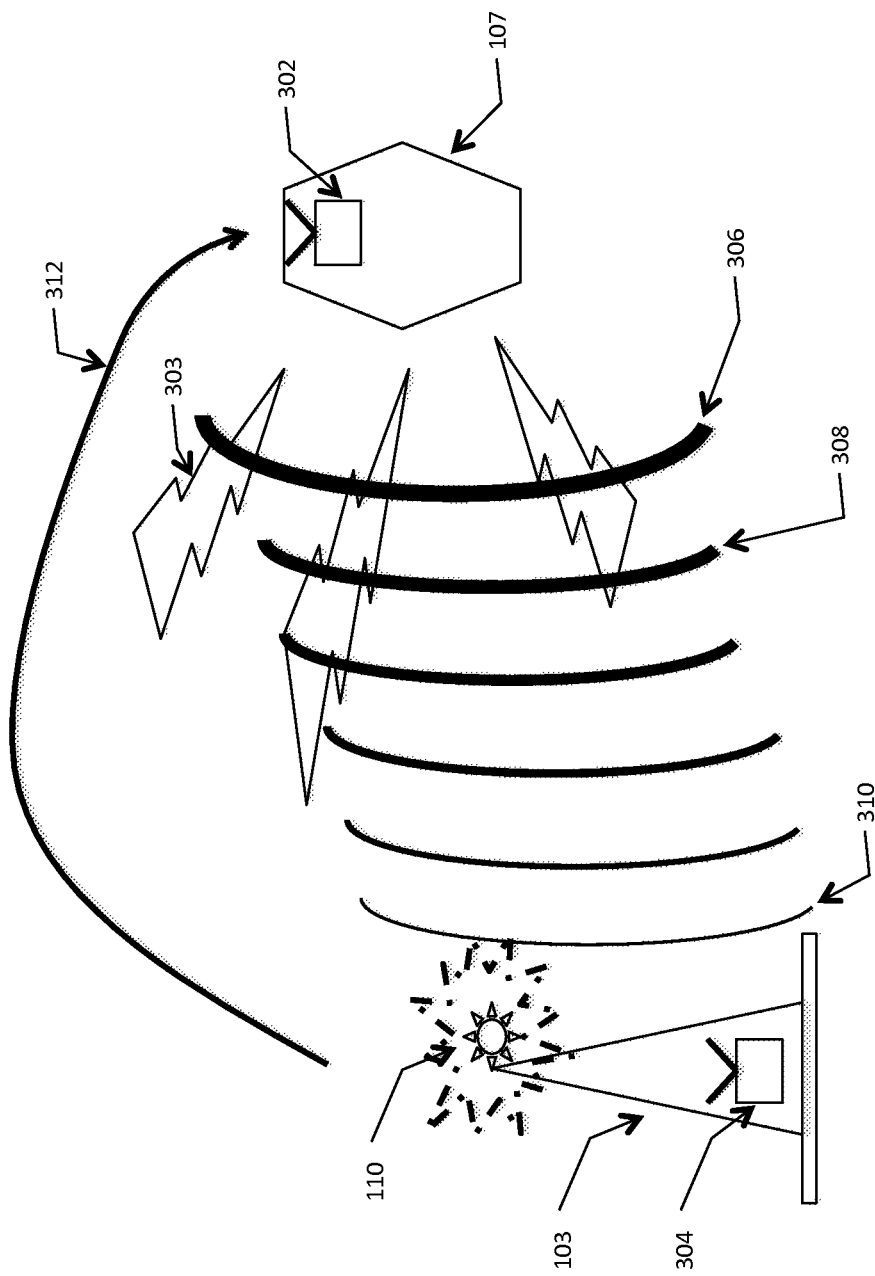
FIG. 3, illustrates further details regarding data transmitted between a beacon and a smart-cone constructed in accordance with the invention.

FIG. 3 illustrates an exemplary communication arrangement between a beacon and a smart-cone of the invention. As is illustrated, the beacon includes an emitter element 302 that radiates signals, which are received by a receiver element 304 of the smart-cone 103. As is known in the art, in such configuration, the observed intensity closer to the beacon 107 is higher than further from it. Additionally, the cone has available a communication channel to the beacon 312, to provide control data such as "start/stop" indications or other feedback actuation control data. Since the intensity of the beacon transmission varies with distance to the cone, the intensity value can be used to correlate distance. In one embodiment, the correlation is by way of a table storing signal strength values. In other embodiments, the correlation is by way of a mathematical formula. For example, a signal strength in the closer band 306, may correspond to a distance of 1 ft, while signal strength in the farthest band 310 may correspond to a distance of 10 ft. As may be appreciated, such correlation can be leveraged to approximate beacon, and in turn corresponding user speed. As is further illustrated, the approximation of distance or speed can be used to indicate whether a light pattern should be actuated to indicate to the user that the drill was preformed appropriately. For example, if minimum speed is required when arriving and departing from the cone vicinity, compliance with such minimum requirement can be indicated by a corresponding light pattern. Moreover, the compliance with such minimum requirement can be indicated to the beacon over the communication link 312 and thereby reported to the user using haptic actuators in the beacon (not shown).

Smart-Cone

Figure 4:
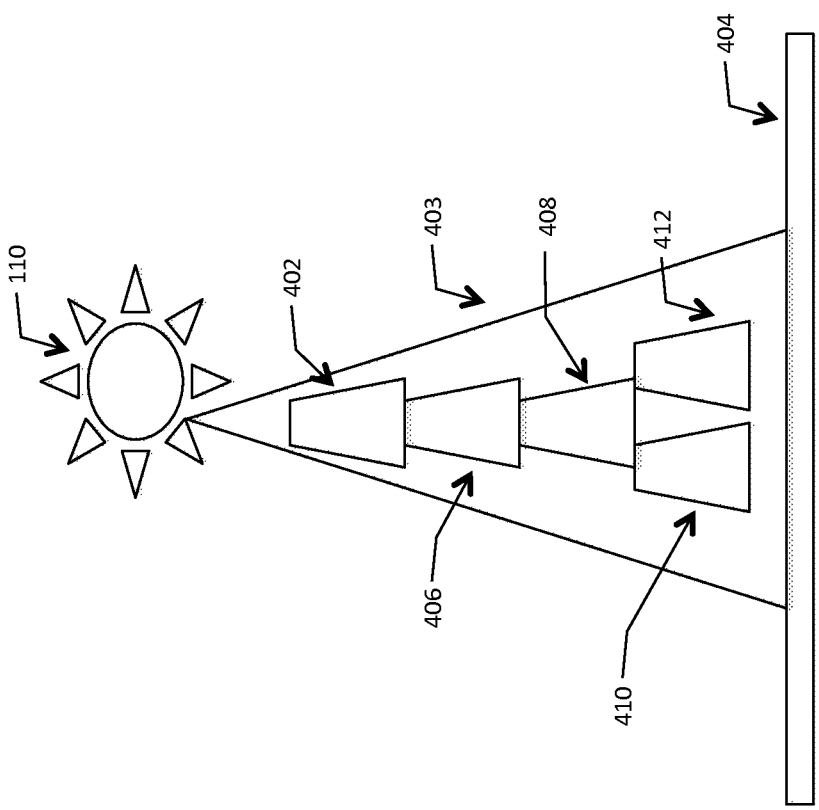
FIG. 4 illustrates some of the physical and logical structure of a smart-cone constructed in accordance with the invention.

FIG. 4 illustrates some of the physical and logical structure of a smart-cone constructed in accordance with the invention. As may be appreciated, the smart-cone preferably includes a receiver element 402, a transmitter element 406, a battery 410, a local processor 408, and the outer shell or body 404. The internal components are preferably arranged within the shell on spring or other vibration isolation elements to reduce risk of damage to the internal components. Further, in one embodiment, many of the internal components are integrated on a single board that is sealed to the elements (water, shock, etc.).

The receiver element 402 includes at least one receiver module to receive wireless data transmission from at least one nearby beacon. The receiver element preferably includes various data reception components as appropriate for the transmission technology employed by corresponding beacons. For examples, for beacons transmitting using low-power Bluetooth technology, the receiver element includes a Bluetooth receiver. In other embodiments, a receiver element includes more than one type of data reception components to allow for beacons using more than one data transmission technology to transmit data to the smart-cone. As may be appreciated, the receiver element also includes other components involved in the reception and optional decoding or demodulation of data such as antenna, power amplifier, modem, etc. In one implementation, the smart-cone includes at least two antennas that can be distinguished by the receiver element to allow for reception of signals from physically spaced apart points. The physical separation of antenna elements could allow a system to more accurately identify the position of a transmitting beacon, and in turn the user wearing the beacon performing the drill, as may be appreciated, using techniques such as triangulation. In some embodiments, the receiver element is also used to receive data from other smart-cones in the vicinity to provide trigger signals or other data used to facilitate participant tracking and pattern configuration.

The transmitter element 402 allows the smart-cone to transmit data to the associated processing system or a beacon, when it is configured with feedback elements. As may be appreciated, the transmitter element employs transmission technology as is appropriate for the processing system or beacon receiving the communication. In one embodiment such transmission technology is WiFi. In another embodiment, the transmission technology additionally includes Bluetooth as well as potentially cellular technologies such as 3G.

The battery 410 is preferably a lightweight rechargeable battery subsystem. The charging of the battery is preferably by induction when the cone is placed over or near a charging antenna of an inductive charging system. In another optional configuration, the charging is by an external charger that is plugged into the battery subsystem.

The local processor 408 provides general system operation support to the smart-cone system to execute a particular interaction as instructed by a processing system or as predefined by a program executing on the local processor. In one embodiment, the processor 408 receives parameters defining how to track a beacon from the associated processing system, which is executing on a smartphone or tablet computer. In another embodiment, the processor 408 has a default set of tracking parameters that are reported to the processing system in the normal course of operation. The processor 408 could also execute power saving routines to conserve battery power. For example, changing to a high power state for reception and decoding of beacon signals can be made only after receiving an instruction from a corresponding processing system or a remote control. Alternatively, the beacon signals could be ignored if no motion is detected for a predetermined time, such as by absence of difference in timestamp information in the received signals or uniform intensity over a predetermined time (i.e., indicating no movement).

The outer shall of the cone 404 serves to both enclose the internal components as well as to provide a visual indicator for the student participating in the drill. In one implementation the outer shell includes an inflatable figure simulating an opponent. In other implementations, the outer shall is made to allow for attachment of visual indicators or other physical elements as appropriate for the drill and participant level to provide feedback. In such one embodiment, a light 110 is provided on the outer shell 404.

In one embodiment, the control application is a computer program executing on a Smartphone. In another embodiment, the control application code is executed on a tablet computer. In yet another embodiment, the processing system is a dedicated device especially constructed for coaching purposes.

Beacon

Figure 5:
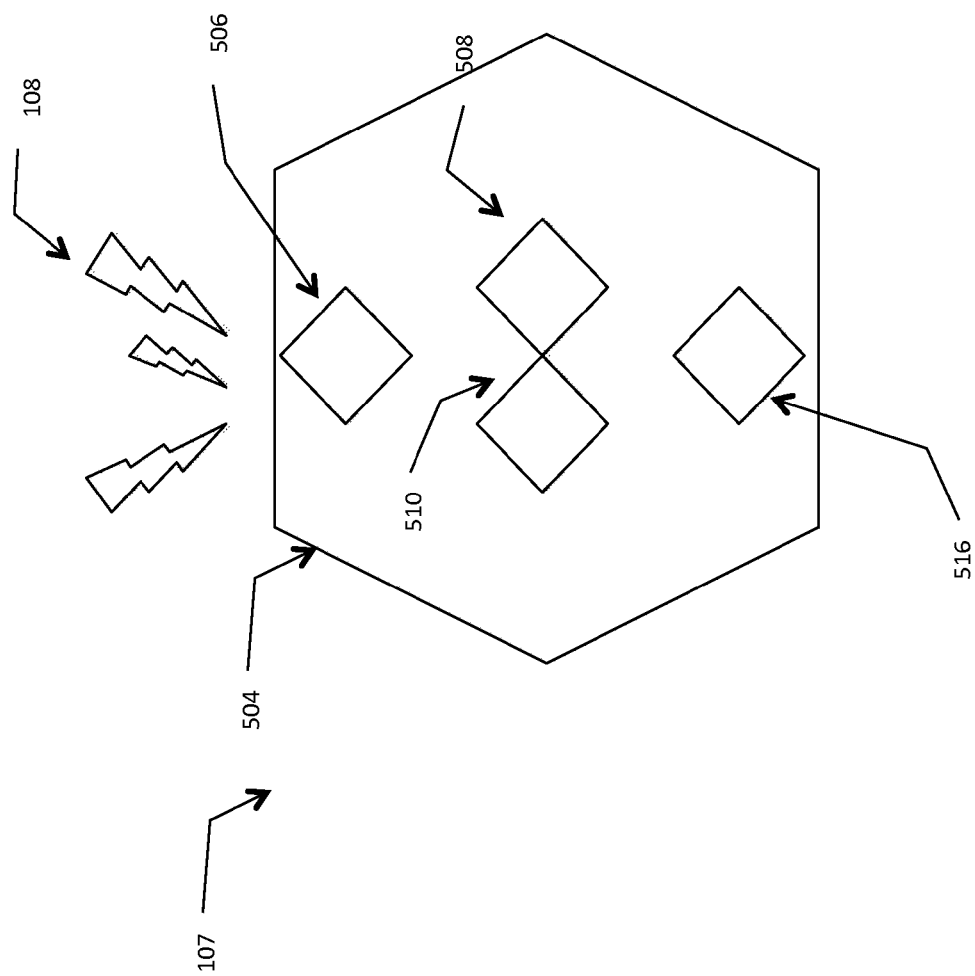
FIG. 5 illustrates some of the physical and logical structure of a beacon constructed in accordance with the invention.

FIG. 5 illustrates some of the physical and logical structure of a beacon constructed in accordance with the invention. Generally, the beacon transmits a signal that is received by a smart-cone to determine relative position between the beacon and the smart-cone. When the relative position of at least two cones is known, detecting such distance to one cone and distance to another cone can be used as one way to determine speed of movement from one position within the defined course to another position. As may be appreciated, information related to relative position of a body-worn beacon and a smart-cone can be used to derive other information related to performance of athletic drills, such as acceleration, distance when changing direction, top speed, etc.

The beacon unit preferably includes a component shell 504 that houses the electronic components of the beacon and a harness portion that is used to removably couple the beacon to the body of a user (e.g., velcro strap). For example, the harness portion could be an elastic band portion that forms a loop and can be expanded to fit over a students ankle or wrist, as may be appreciated. Alternatively, the harness portion could include an elastic bank in combination with a Velcro harness as is used to attach other athletic accessories to a user's body or outerwear. The component shell that houses the internal electronics could be made of plastic or other resin that is appropriate for the particular activity targeted for the beacon as well as the weight and dimensions of the internal components housed by the shell.

The internal components preferably include a transmitted unit 506, a controller 510, a battery 516, and an optional accelerometer 508. The transmitted unit 506 preferably includes an antenna and other components used to transmit data 108 to a smart-cone receiver element. Additionally, the transmitter unit 506 could include other components such as a power amplifier, modulator, etc. In some configurations the transmitter unit includes components to allow for only transmission in the low power mode. In other embodiments the transmitter unit includes components to allow for transmissions using other wireless technologies such as WiFi or Bluetooth. The transmitter unit 506 is preferably coupled to a controller 510 to receive digital data for transmission. As discussed above, such data include the beacon identifier as well as time stamps indicating when the data was generated (e.g., in a synchronous arrangement). The controller unit 510 preferably includes a clock that is synchronized to the smart-cone clock unit to allow for the distance calculation. Alternatively, the controller unit 510 could include a receiver that is used to receive synchronization and calibration signals. In other embodiments the beacon unit includes a receiver that is used to receive short data indications that provide feedback (e.g., haptic) to the participant user wearing the beacon. As discussed above, such data can also be conveyed to the user when the beacon illuminates a particular LED or by engaging a motor to generate vibration burst to signify correct execution of a drill (haptic feedback).

The beacon battery 516 supplies power to the internal electronic components. The battery may be a disposable standard battery used in small devices such as hearing-aid devices. Alternatively, the battery could be a rechargeable battery that is charged by the smart-cone inductive charger or by a secondary inductive charger provided by the smart-cone itself in a relay configuration.

The optional accelerometer 508 can be used to conserve battery power by only activating the beacon transmitter when user movement is sensed and is beyond a threshold. For example, an electro-mechanical pedometer can be used by the accelerometer to sense when the user is running faster than a predetermined rate. When such threshold rate is exceeded, the beacon transmits periodic data to the smart-cone. Alternatively, the pedometer accelerometer can indicate to the beacon when the user has changed direction in a particular way to improve accuracy of movement detection and positioning relative to the smart-cone as well as other cones making up the particular drill setup. In other configurations, the accelerometer data is further used by the smart-cone to refine and increase accuracy of position information in a system of the invention.

The user-worn beacon preferably includes at least one transmitter for sending data over a wireless communication link. Alternatively, the beacon could include a transmitter to send data over an audible link such as ultrasound wave communication. Preferably the data includes information that can be used to resolve identity between several beacons of the system. For example, the data could include a unique ID that is assigned to the beacon when the system is configured for operation. Alternatively, the unique ID can be factory-set, such that all beacons in operation from a particular manufacturer carry unique IDs. Preferably, the beacon ID is associated with descriptive information by a local database that allows for presentation to a coach on a processing system to determine which student was performing the drill.

Operation of the Exemplary System

Figure 6:
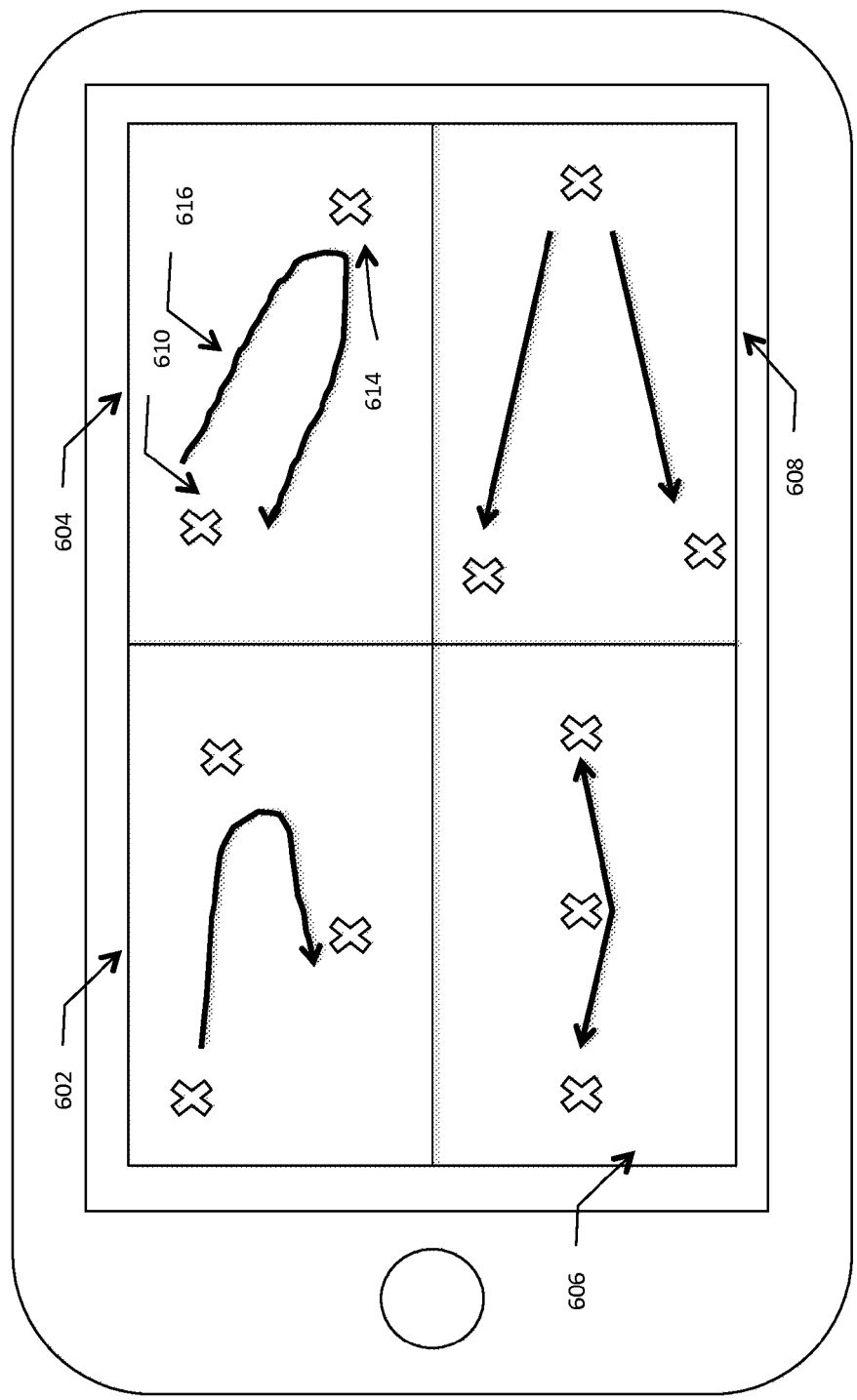
FIG. 6 is a flow diagram illustrating an operating mode of the illustrated system of FIG. 1.

FIG. 6 is a flow diagram illustrating the operation of the exemplary system. In one embodiment, the control application running on the tablet computer transmits cone configuration data to some or all the smart-cones in the arrangement and optionally to the beacon as well (step 702). In one arrangement each cone transmits its identifier so that such transmission can be sensed by other smart-cones in the configuration (step 704). Such transmission can be used to assess distance between smart-cones and report to the control application or alternatively self correct by reference to configuration parameters. In one embodiment, an alternative method employs a camera on the smart-cone to assess distance by reference to relative size of known dimension visually perceptible image on each cone (e.g., a triangle of known dimensions). Each smart-cone then actuates a visual indicator that is human perceptible so that the relative distance of the cone from other cones in the configuration could be adjusted by the user or trainer/coach (step 706). In one embodiment such indicia is by a blinking directional arrow on the cone, indicating a direction for adjustment. Next, the cones transmit a ready command to the control application or alternatively to another smart-cone (in the peer to peer configuration)(step 708). The control application then instructs the smart-cones as to the interactivity parameters associated with the drill (step 710). Such parameters are related to how feedback indication is provided to the user. For example, the feedback parameters could indicate that the light should stop blinking if the user is within 5 ft of the cone for less than 2 seconds. The control application then instructs the first cone in the drill patters to initiate visual indication as the first step in the drill (step 712).

Since the beacon may include an on/off button to allow for conservation of battery life, the user could then activate the beacon and starts performing the drill. The beacon then initiates transmission of the beacon ID so that it can be sensed by the smart-cones of the system (step 714). The cones transition to a ready to receive state (step 716). In one example drill, the student is directed to run towards a single smart-cone and then move away from the cone, with the direction change initiated as close as possible to the cone. Accordingly, the student advances towards the cone. The beacon transmission is received by the receiver of the smart-cone. In some embodiments, the beacon transmission is only received by the smart-cone when the beacon is positioned within a predetermined distance from the cone. The smart-cone then reports such detection of the beacon, preferably arrival and departure times, to the control application (step 718). Once the beacon has been sensed as proximate to the final smart-cone in the drill pattern, the control application transmits a reset pattern command to indicate to the smart-cones and beacons of the system that they should return to the initialized state.

As may be appreciated, several methods could be used to determine distance to the smart-cone from the bacon. In one configuration, the transmission includes a synchronized timestamp such that it is derived from clock data shared between the smart-cone and the beacon. Therefore, when received by the smart-cone the beacon signal can be used to deduct a beacon distance from the cone. This can be resolved by applying the formula Distance=Delta(time)*c(speed of light). Several such signal receptions can be used to determine the speed of the beacon using speed=Delta(Distance)/time. In some configurations the cone performs such calculations internally. In other configurations, the cone provides the data to an associated processing system such as a smartphone, which performs the calculations using a potentially more powerful processor. In one configuration such calculations are continuously performed until the system senses that the user is stationary for greater than predetermined duration (e.g., one second). In other configurations, the determination that the beacon has started progressing away from the smart-cone triggers the shutdown since apparently the user has completed the exercise by advancing away from the cone. In other configurations, when several cones are combined to a greater system for tracking drill performance, tracking of distance moving away from the furthest cone in the configuration would trigger the shutdown.

The User Application

Figure 7:
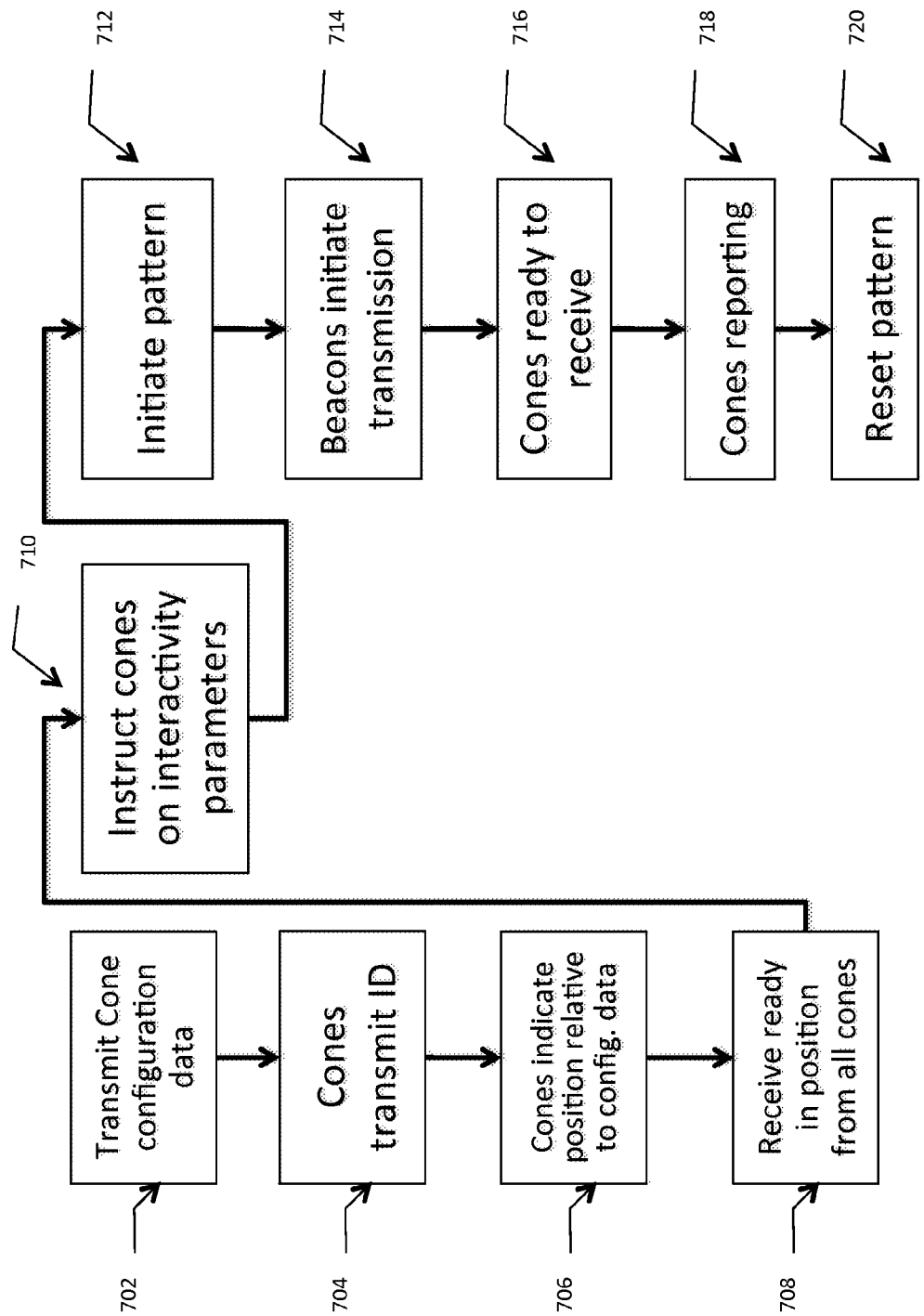
FIG. 7 illustrates a computer-based application associated with a system of the invention.

The smart-cone system is preferably associated with an application that graphically represents student position relative to the smart-cone (and potentially other non-smart-cones positioned in its vicinity at predefined distances). FIG. 7 illustrates a user screen of an application for use with a system of the invention. The application may be implemented as an App such as those available on mobile operating system provided App Stores. The application could also be provided as a website over HTML5 for example. In one implementation, the application allows for selection of a preset configuration or exercise routine from several available drills 602, 604, 606, 608. Once the drill is selected, the application communicates with the smart-cone to provide certain settings (e.g., start tracking when closer than 6 ft) as relevant to the particular drill and student goals. Once the beacon has passed through the course, the application could provide a graphical representation of approximate track along the drill route 616. Additionally, the application could indicate by PASS/FAIL whether the student complied with certain minimum or maximum parameters (speed, distance from cone, etc.). The PASS/FAIL indication can be relayed to the coach, student, or both. The PASS/FAIL indication may also be conveyed to the student using the indicators on the smart-cone or beacon that the user is wearing.

In such configuration, the beacon includes an indicator that notifies the student whether they complied with the drill parameters. For example, the indicator could be a light that is illuminated red for FAIL or green for PASS. In other implementations, the indicator is by vibration of the beacon that is sensed by the wearer's skin (For example, when the beacon is ankle-worn and not readily visible).

As discussed above, the system could operate without the control application, only including the smart-cone and a beacon, in configurations where the beacon provides feedback to the user. In this configuration, the only user interface is a light indicating proper execution of the drill, which is preset by the system provider or chosen by a selector switch on the cone. The drill could be varied by pressing a button or other user interface on the smart-cone to scroll through drills and potentially difficulties. In this way an economical and convenient way is provided for a student to train alone without an instructor supervising the drill.

In another configuration, the smart-cone communicates feedback data to both the beacon and the portable computing device application. In some configuration the portable computing device processor receives raw data from the smart-cone and processes the data to determine student position as relative to the executed drill. Such processing can indicate proper execution of the drill or alternatively rate the execution as relative to other students using criteria such as time, distance to cones, acceleration, etc. Such information can be used by the coach to improve performance or, alternatively, to modify the drill to better fit the student ability.

In some implementations, the system is provided with an application that allows for the downloading of additional drills from a manufacturer website. Such delivery of new drills to the student or coach could have the effect of providing proper progress in drill difficulties as well as augmentation of the drills based on student or coach needs. For example, the coach may request to receive defender drills to train defensive players and attacker drills to train attacking players in the game of soccer. As may be appreciated, the application and drills do not need to come from the device manufacturer but could also be provided by unrelated parties that separately engage the smart-cone owner to deliver applications and related drills or game levels. In some instances student progress is relayed by the mobile computing device to an Internet website that allows users to share performance information so as to allow for sporting competition between users that are not necessarily in close physical proximity.

Although the present invention was discussed in terms of certain preferred embodiments, the description is not limited to such embodiments. Rather, the invention includes other embodiments including those apparent to a person of ordinary skill in the art. Thus, the scope of the invention should not be limited by the preceding description but should be ascertained by reference to the claims that follow.

I claim:

1. A system for athletic training, comprising:
   a body-worn beacon configured to transmit data over a short range, the data specially constructed to allow for spatial resolution by a properly compatible receiver unit;
   a first portable receiver unit positioned in close proximity to the body-worn beacon, the portable receiver configured to receive data from the beacon and further configured to resolve distance data to the beacon by reference to specially constructed data received from the beacon;
   a second portable receiver unit positioned a predetermined distance from said first portable receiver unit, the second portable receiver unit receiving a signal from the first portable receiver unit, the second portable receiver unit responding to said signal by actuating a visual indicator on said second portable receiver unit exterior such that it is human perceptible; and
   a second receiver unit coupled to said second portable receiver unit and configured to receive the specially constructed data from the beacon and record such reception by the second receiver unit.

2. The system of claim 1, wherein the beacon further includes an actuator to generate an indication that is provided to users wearing the beacon.

3. The system of claim 1, wherein the first portable receiver unit includes a distance approximation unit to approximate distance to the second portable receiver unit.

4. The system of claim 1, wherein the first portable receiver unit further comprises an ultrasound sensor.

5. The system of claim 1, wherein the signal transmitted from the body-worn beacon is range limited.

6. An athletic training apparatus, comprising:
   a housing configured to contain electronic components and to allow for positioning the apparatus on a flat surface in an upright orientation;
   a battery module to supply power to the electronic components contained within the housing;
   a radio transceiver configured to receive beacon identifier signals over a predetermined frequency using a predetermined radio technology;
   a distance resolution module to correlate beacon identifier signal properties with distance between the transmitting beacon and the radio transceiver;
   a human perceptible indicia generating module for generating a human perceptible indicia in response to an externally generated signal received by the radio transceiver over a predetermined frequency and using a predetermined radio technology; and
   a processing module configured to execute computer instruction that instruct the radio receiver/transmitter to externally transmit an instruction to an indicia generating module to generate an indicia in response to a predetermined parameter related to data sensed by the processing module.

7. The apparatus of claim 6, wherein the externally transmitted instruction is directed to a second apparatus comprising a housing, battery module, radio transceiver, distance resolution module, human perceptible indicia generation module, and processing module.

8. The apparatus of claim 6, wherein the radio transceiver predetermined radio technology for sensing a beacon identifier signal is Bluetooth technology.

9. The apparatus of claim 6, wherein the externally generated signal received to actuate the human perceptible indicia generating module is using WiFi technology.

10. The apparatus of claim 6, further comprising a camera module to determine distance to a second training apparatus.

11. The apparatus of claim 7, further wherein each apparatus includes a receiver module to receive configuration distance data; and
   a distance resolution module to resolve distance to a second athletic training apparatus.

12. An athletic training method, comprising:
   a. transmitting instructions to a plurality of smart-cones to indicate relative position;
   b. at least one smart-cone reporting position relative to other smart-cones;
   c. each of the positioned cones configured to sense beacon signals in its vicinity;
   d. in response to sensing a beacon signal in the vicinity, reporting at least beacon signal arrival and departure relative times;
   e. generating a human perceptible indication at a smart-cone that is configured to sense beacon arrival according to a smart-cone traversal order; and
   f. providing feedback by actuating a haptic circuit in a beacon module that is generating the sensed signals.

13. The method of claim 12, further comprising at least one smart-cone activating fine tracking using a camera in response to detecting the beacon radio signal.

* * * * *